(12) United States Patent
Hussain

(10) Patent No.: US 8,369,419 B2
(45) Date of Patent: Feb. 5, 2013

(54) SYSTEMS AND METHODS OF VIDEO COMPRESSION DEBLOCKING

(75) Inventor: Zahid Hussain, Ascot (GB)

(73) Assignee: Via Technologies, Inc., Taipei (TW)

( * ) Notice: Subject to any disclaimer, the term of this patent is extended or adjusted under 35 U.S.C. 154(b) by 1664 days.

(21) Appl. No.: 11/749,811

(22) Filed: May 17, 2007

(65) Prior Publication Data

US 2007/0291857 A1 Dec. 20, 2007

Related U.S. Application Data

(60) Provisional application No. 60/814,623, filed on Jun. 16, 2006.

(51) Int. Cl.
*H04L 11/02* (2006.01)
*H04N 7/167* (2011.01)

(52) U.S. Cl. ......... 375/240.29; 375/240.12; 375/240.13; 375/240.23; 380/217

(58) Field of Classification Search ............. 375/240.29; 380/217
See application file for complete search history.

(56) References Cited

U.S. PATENT DOCUMENTS

| | | | |
|---|---|---|---|
| 5,742,346 A * | 4/1998 | Sievers et al. ............ 375/240.24 |
| 5,920,356 A * | 7/1999 | Gupta et al. ................... 348/606 |
| 5,973,748 A | 10/1999 | Horiguchi et al. |
| 6,496,537 B1 | 12/2002 | Kranawetter et al. |
| 6,717,988 B2 | 4/2004 | Peng et al. |
| 6,871,001 B1 | 3/2005 | Okada |
| 7,412,109 B2 * | 8/2008 | Kong et al. ..................... 382/261 |
| 7,684,489 B2 | 3/2010 | Johansen et al. |
| 2003/0007565 A1 * | 1/2003 | Morishita et al. ........ 375/240.18 |
| 2004/0071217 A1 | 4/2004 | Lin |
| 2004/0071363 A1 * | 4/2004 | Kouri et al. .................... 382/276 |
| 2005/0122341 A1 | 6/2005 | MacInnis et al. |
| 2005/0244063 A1 * | 11/2005 | Kwon et al. .................. 382/233 |
| 2005/0262276 A1 | 11/2005 | Singh et al. |
| 2005/0286640 A1 * | 12/2005 | Gaylord .................... 375/240.25 |
| 2006/0098744 A1 * | 5/2006 | Huang ...................... 375/240.29 |
| 2006/0110065 A1 * | 5/2006 | Huang et al. .................. 382/275 |
| 2008/0165863 A1 * | 7/2008 | Yan .......................... 375/240.29 |

FOREIGN PATENT DOCUMENTS

| | | |
|---|---|---|
| JP | 2001-285802 | 10/2001 |
| WO | 2004/030369 | 4/2004 |
| WO | 2004/091101 | 10/2004 |
| WO | WO 2004/105399 | 12/2004 |

OTHER PUBLICATIONS

English language translation (computer-generated translation) of JP 2001-285802 (published Oct. 12, 2001).

* cited by examiner

*Primary Examiner* — Edan Orgad
*Assistant Examiner* — Jenise Jackson
(74) *Attorney, Agent, or Firm* — McClure, Qualey & Rodack, LLP

(57) ABSTRACT

An exemplary video decoder comprises: an entropy decoder; a spatial decoder; combining logic; and an inloop deblocking filter. The entropy decoder receives an incoming coded bit stream. The spatial decoder receives the output of the entropy encoder and produces an encoded picture comprising a plurality of pixels. The combining logic combines a current picture with a prediction picture to produce a combined picture. The inloop deblocking filter receives the combined picture. The inloop deblocking filter comprises: logic configured to filter a predefined pixel group; and logic configured to filter each of the remaining pixel groups in the plurality after the predefined pixel group, according to a corresponding set of taps in a plurality of sets of taps, if the predefined pixel group meets a criteria.

20 Claims, 11 Drawing Sheets

MODULE DEF.
SECTION 410

ITERATION
SECTION 420

TEST
VERTICAL
SECTION 430

TEST 3RD LINE
SECTION 440

INSTANTIATE
SECTION 450

```
MODULE VC1_INLOOP_FILTER(T#, S#, U, V);
INPUT  REG [] T#;
INPUT  REG [] S#;
INPUT  REG [15:0]  U, V;

FOR I (2, 0, 1, 3){
    IF (VERTICAL){
        P[1] = MA[0][I];
        P[2] = MA[1][I];
        P[3] = MA[2][I];
        P[4] = MA[3][I];
        P[5] = MA[4][I];
        P[6] = MA[5][I];
        P[7] = MA[6][I];
        P[8] = MA[7][I];
    } ELSE {
        P[1] = MA[I][0];
        P[2] = MA[I][1];
        P[3] = MA[I][2];
        P[4] = MA[I][3];
        P[5] = MA[I][4];
        P[6] = MA[I][5];
        P[7] = MA[I][6];
        P[8] = MA[I][7];
    }

IF (I == 2){
        ProcessingPixel3 = 1;
        FILTER_OTHER_3 = 1;
    } ELSE ProcessingPixel3 = 0;

VC_1_INLOOPFILTER_LINE(P,
        FILTER_OTHER_3,
        PQUANT,
        ProcessingPixel3);
}
ENDMODULE
```

FIG. 4

```
MODULE DEF   MODULE VC_1_INLOOPFILTER_LINE(P, FILTER_OTHER_3,
SECTION      PQUANT, ProcessingPixel3);
510          INOUT REG [7:0] P[1:8];
             INOUT REG FILTER_OTHER_3;
             INPUT REG [7:0] PQUANT;
             INPUT REG ProcessingPixel3;

PIXEL        A0[I]=(2(P3[I]-P6[I])- 5(P4[I]-P5[I])+ 4) >> 3
CALC         A1[I]=abs((2(P1[I]-P4[I])- 5(P2[I]-P3[I])+4)>> 3)
SECTION      A2[I]=abs((2(P5[I]-P8[I])- 5(P6[I]-P7[i])+4)>> 3)
520          A3[I]=min(A1[I], A2[I])
             D[I]=(5(sgn(A0[I])* A3[I] - A0[I])) >> 3
             CLIP[I]=(P4[I]- P5[I])>> 1
             IF (CLIP[I] > 0){
                 IF (D[I] < 0) D[I]=0
                 IF (D[I] > CLIP[I]) D[I]=CLIP[I]
             } ELSE {
                 IF (D[I] > 0) D[I] = 0
                 IF (D[I} < CLIP[I]) D[I]=CLIP[I]
             }

//set appropriate predicate
TEST 3RD     IF (ProcessingPixel3){
PIXEL            DO_FILTER = TRUE;
SECTION 530      AA0 = abs(A0[3])
                 Cond1 = (AA0 >= PQUANT)
                 Cond2 = (A3[3] >= AA0)
                 Cond3 = (CLIP[3] == 0)
                 IF (!Cond1 || !Cond2 || Cond3)
                     DO_FILTER = FALSE
             } ELSE
                 DO_FILTER = FILTER_OTHER_3

TEST DO_FILTER
SECTION 540  IF (DO_FILTER){
                 P4[I]=P4[I]- D[I]
                 P5[I]=P5[I]+ D[I]
             }
UPDATE STATE
SECTION 450  IF (ProcessingPixel3)
                 FILTER_OTHER_3 = DO_FILTER
             ENDMODULE
```

FIG. 5

|     | C1    | C2    | C3    | C4    |   |
|-----|-------|-------|-------|-------|---|
| R1  | R1,C1 | R1,C2 | R1,C3 | R1,C4 | e |
| R2  | R2,C1 | R2,C2 | R2,C3 | R2,C4 | f |
| R3  | R3,C1 | R3,C2 | R3,C3 | R3,C4 | g |
| R4  | R4,C1 | R4,C2 | R4,C3 | R4,C4 | h |
|     | a     | b     | c     | d     |   |

FIG. 8

SYSTEMS AND METHODS OF VIDEO COMPRESSION DEBLOCKING

CROSS REFERENCE TO RELATED APPLICATIONS

This application claims the benefit of U.S. Provisional Application No. 60/814,623, filed Jun. 16, 2006.

FIELD OF THE DISCLOSURE

The present disclosure relates to video compression and decompression, and more specifically to a graphics processor unit that contains features for video compression and decompression.

BACKGROUND

Personal computers and consumer electronic devices are used for a variety of entertainment functions. These entertainment functions can be roughly divided into two different types: that which uses computer-generated graphics, such as computer games; and that which uses compressed video streams, such as programs pre-recorded onto digital video disk (DVD), and digital programming provided to a set-top box by cable or satellite operators. The second type also includes encoding of analog video streams, such as performed by a digital video recorder (DVR).

Computer-generated graphics are typically generated by a graphics processing unit (GPU). A GPU is a specialized type of microprocessor found on computer game consoles and some personal computers. A GPU is optimized to perform fast rendering of three-dimensional primitive objects such as triangles, quadrilaterals, etc. The primitives are described with vertices, where each vertex has attributes (e.g., color), and textures can be applied to the primitives. The result of the rendering is a two-dimensional array of pixels which appears on a computer display or monitor.

Encoding and decoding of video streams involves computations of a different sort (e.g., discrete cosine transform, motion estimation, motion compensation, deblocking filters) These computations are typically handled by a general purpose central processing unit (CPU) in combination with specialized hardware logic such as application-specific integrated circuits (ASICs). Consumers therefore need multiple computing platforms to meet their entertainment needs. A single computing platform that handles both computer-generated graphics and video encoding and/or decoding is therefore desirable.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 4 is a listing of hardware description pseudocode for the IDF hardware acceleration logic 400 from FIG. 1.

FIG. 5 is a listing of hardware description pseudocode for the line acceleration logic 500 from FIG. 4.

FIG. 8 is a block diagram of a 16×16 macroblock as used in H.264.

DETAILED DESCRIPTION

The embodiments disclosed herein provide systems and methods for video compression deblocking. An exemplary deblocking filter for video decoding comprises: logic configured to determine if pixels in a predefined one of a plurality of pixel groups meets a criteria; logic configured to filter the pixels in the predefined pixel group first, if the criteria is met; and logic configured to sequentially filter the pixels in each of the remaining pixel groups in the plurality, according to a corresponding set of taps in a plurality of sets of taps, if the criteria is met.

An exemplary video decoder comprises: an entropy decoder; a spatial decoder; combining logic; and an inloop deblocking filter. The entropy decoder receives an incoming coded bit stream. The spatial decoder receives the output of the entropy encoder and produces an encoded picture comprising a plurality of pixels. The combining logic combines a current picture with a prediction picture to produce a combined picture. The inloop deblocking filter receives the combined picture. The inloop deblocking filter comprises: logic configured to filter a predefined pixel group; and logic configured to filter each of the remaining pixel groups in the plurality after the predefined pixel group, according to a corresponding set of taps in a plurality of sets of taps, if the predefined pixel group meets a criteria.

An exemplary graphics processing unit comprises a host interface and a video acceleration unit. The host interface receives video acceleration instructions. The video acceleration unit is responsive to the video acceleration instructions. The video acceleration function comprises an inloop deblocking filter. The inloop deblocking filter comprises: logic configured to determine if pixels in a predetermined one of a plurality of pixel groups meets a first criteria; logic configured to filter the pixel group first, if the first criteria is met; and logic configured to sequentially filter each of the remaining pixel groups in the plurality, according to a corresponding set of taps in a plurality of sets of taps, if the first criteria is met.

Computing Platform for Video Encoding/Decoding

Figure 1:
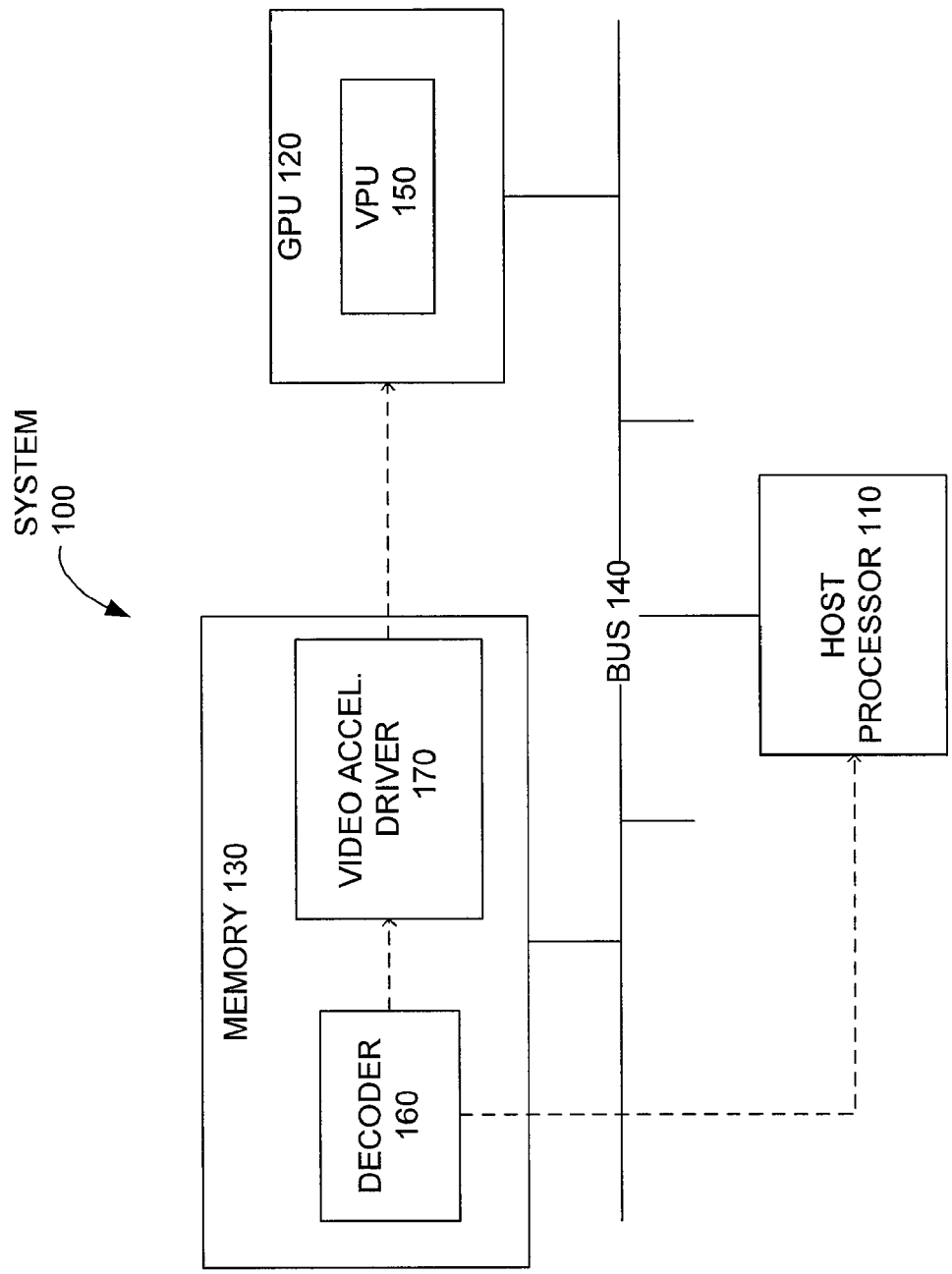
FIG. 1 is a block diagram of an exemplary computing platform for both graphics and video encoding and/or decoding.

FIG. 1 is a block diagram of an exemplary computing platform for both graphics and video encoding and/or decoding. System 100 includes a general purpose CPU 110 (hereinafter referred to as host processor), a graphics processor (GPU) 120, memory 130, and bus 140. GPU 120 includes a video acceleration unit 150 (also known as VPU 150) which accelerates video encoding and/or decoding, as will be described herein. The video acceleration functions of GPU 120 are made available as instructions which execute on GPU 120.

Software decoder 160 and video acceleration driver 170 reside in memory 130, and at least some portion of decoder 160 and video acceleration driver 170 execute on host processor 110. Through a host processor interface 180 provided by video acceleration driver 170, decoder 160 can also cause video acceleration instructions to be issued to GPU 120. Thus, system 100 performs video encoding and/or decoding through host processor software which issues video acceleration instructions to GPU 120, with GPU 120 responding to these instructions by accelerating some portions of decoder 160.

In some embodiments, only a relatively small portion of decoder 160 executes on host processor 110, while a larger portion of decoder 160 is performed by GPU 120, with very minimal driver overhead. In this manner, computationally intensive blocks which are frequently executed are offloaded to GPU 120, while more complex operations are performed by host processor 110. In some embodiments, one of the computationally intensive functions implemented by GPU 120 includes inloop deblocking filter hardware acceleration logic 400, also known as inloop deblocking filter 400 or deblocking filter 400, which will be described later in connection with FIG. 4. Another example of a computationally intensive function is determining the boundary strength (bS) for each filter.

The architecture described herein thus allows the flexibility of either: executing decoder 160 on host processor 110 with specific functions (such as deblocking or computation of boundary strength) performed on a macroblock (or picture basis) through running a shader program; or executing large portions of decoder 160 on GPU 120, which exploits pipelining and parallelism. In some embodiments where decoder 160 executes on GPU 120, the deblocking process is a thread with synchronization between the various aspects of the decoder 160.

Omitted from FIG. 1 are a number of conventional components, known to those skilled in the art, that are unnecessary to explain the video acceleration features of GPU 120.

Video Decoder

Figure 2:
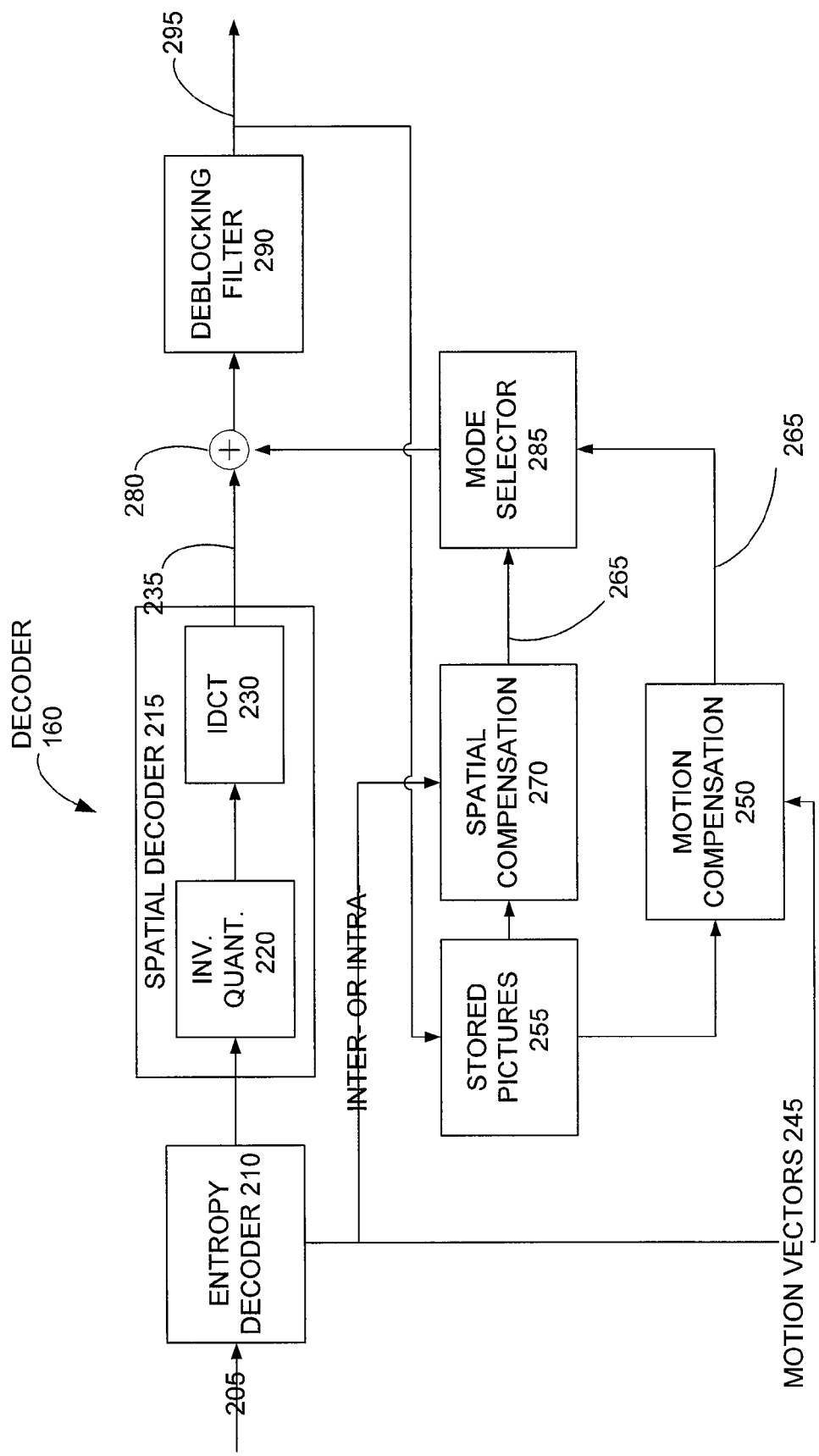
FIG. 2 is a functional diagram of the video decoder 160 from FIG. 2.

FIG. 2 is a functional diagram of the video decoder 160 of FIG. 1. In the particular embodiment illustrated in FIG. 2, decoder 160 implements the ITU H.264 video compression standard. However, a person of ordinary skill in the art should understand that the decoder 160 of FIG. 2 is a basic representation of a video decoder that also illustrates operation of other types of decoders that are similar to H.264, such as the SMPTE VC-1 and MPEG-2 standards. Furthermore, although illustrated as part of a GPU 120, a person of ordinary skill in the art should also understand that portions of decoder 160 disclosed herein may also be implemented outside of a GPU, for example, as standalone logic, as part of an application specific circuit (ASIC), etc.

The incoming bit stream 205 is first processed by an entropy decoder 210. Entropy encoding takes advantage of statistical redundancy: some patterns occur more commonly than others, so the commonly occurring ones are represented with shorter codes. Examples of entropy encoding include Huffman coding and run-length encoding. After entropy decoding, the data is processed by a spatial decoder 215, which takes advantage of the fact that neighboring pixels within a picture are often the same, or are related, so that only the differences are encoded. In this example embodiment, spatial decoder 215 comprises an inverse quantizer 220, then an inverse discrete cosine transform (IDCT) function 230. The output of IDCT function 230 can be considered to be a picture (235), composed of pixels.

Picture 235 is processed in smaller subdivisions called macroblocks. The H.264 video compression standard uses a macroblock size of 16×16 pixels, but other compression standards may use different sizes. Macroblocks within picture 235 are combined with information in previously decoded picture(s), a process called "inter prediction", or with information in other macroblocks in current picture 235, a process called "intra prediction". The incoming bit stream 205, as decoded by entropy decoder 210, specifies the type of picture and thus whether inter- or intra-prediction is to be applied.

When inter-prediction is applied, entropy decoder 210 produces a motion vectors 245 output. Motion vectors 245 are used for temporal encoding, which takes advantage of the fact that often many pixels in a series of pictures will have the same value. The changes from one picture to the next are encoded as motion vectors 245. Motion compensation block 250 combines motion vectors 245 with one or more previously decoded pictures 255 to produce a prediction picture (265). When inter-prediction is applied, spatial compensation block 270 combines the current macroblocks in picture 235 with information from neighboring macroblocks to produce a prediction picture (275).

Combiner 280 adds current picture 235 to the output of mode selector 285. Mode selector 285 uses information in the entropy-decoded bit stream to determine whether combiner 280 uses the prediction picture (265) produced by motion compensation block 250, or uses the picture (275) produced by spatial compensation block 270.

The encoding process introduces artifacts such as discontinuities along macroblock borders, and along sub-block borders within macroblocks. The result is that "edges" appear in the decoded frame where none appeared in the original. Inloop deblocking filter 290 is applied to the combined picture, output by combiner 280, to remove these edge artifacts. The decoded picture (295) produced by inloop deblocking filter 290 is stored for use in decoding future pictures.

As discussed earlier in connection with FIG. 1, portions of decoder 160 run on host processor 110, but decoder 160 also takes advantage of video acceleration instructions provided by GPU 120. Specifically, some embodiments of inloop deblocking filter 290 use one or more instructions provided by GPU 120 to implement the filter with a relatively low computational cost.

Deblocking Filter

Inloop deblocking filter 290 is a multi-tap filter which modifies pixel values on the edge of sub-blocks based on nearby pixel values. Different embodiments of inloop deblocking filter 290 can be used depending on the compression standard implemented by decoder 160. Each standard uses different filter parameters, e.g., the size of the sub-block, the number of pixels updated by the filtering operation, the frequency with which the filter is applied (e.g., every Nth row or Mth column). Furthermore, each standard uses a different configuration of filter taps. A person of ordinary skill in the art should understand multi-tap filters, so specific tap configurations will not be discussed here.

An implementation of the deblocking filter specified by the VC-1 standard will be described below in connection with FIG. 4. First the sub-block pixel arrangement for the VC-1 filter will be described in connection with FIG. 3.

Figure 3:
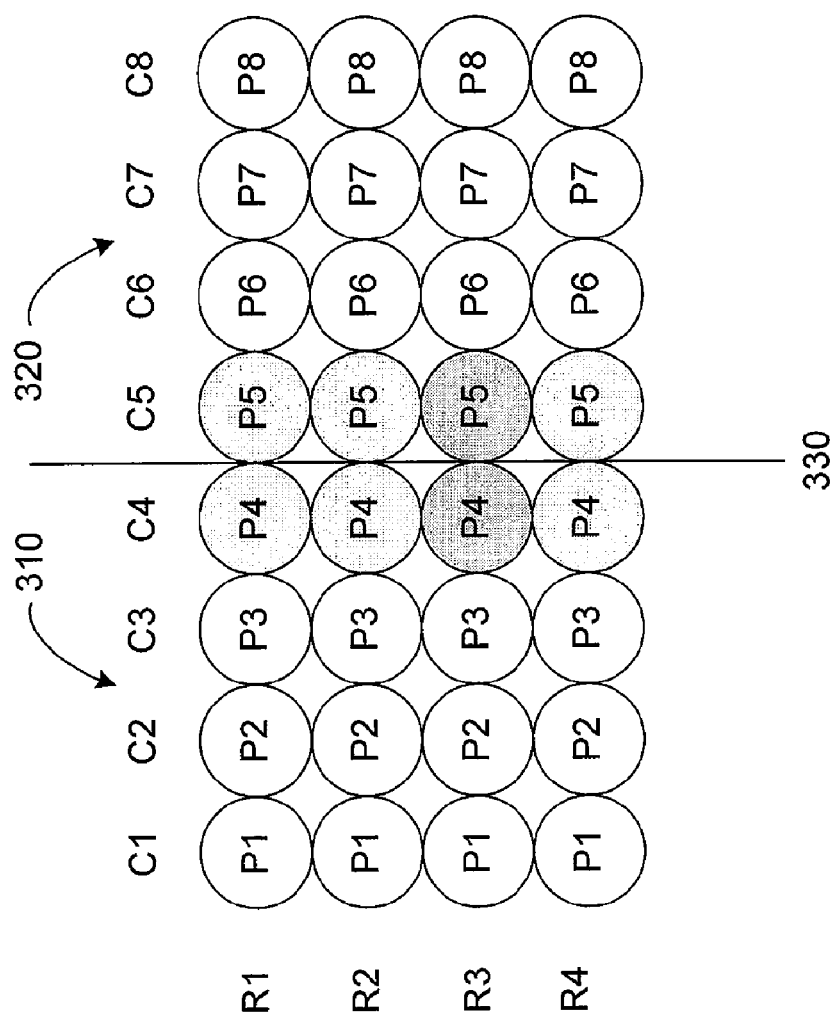
FIG. 3 illustrates the sub-block pixel arrangement for a VC-1 filter.

FIG. 3 shows two adjacent 4×4 sub-blocks (310, 320), identified as rows R1-R4 and columns C1-C8. The vertical edge 330 between these two sub-blocks is along columns C4 and C5. The VC-1 filter operates on each 4×4 sub-block. For the leftmost sub-block, the VC-1 filter examines the pixels in a predefined group of pixels (P1, P2, and P3) in a predefined row (R3). If the predefined group of pixels meets a specific criteria, another pixel (P4) in the same predefined row is updated. The criteria is defined by a particular set of calculations and comparisons of the pixels in the predefined group. A person of ordinary skill in the art will recognize that these calculations and comparisons can also be viewed as a set of taps, and details of the calculations and the comparisons will be discussed later in connection with FIG. 5.) The updated value is also based on calculations performed on the pixels in the predefined group.

The VC-1 filter treats the rightmost sub-block in an analogous manner, determining whether the pixels P6, P7, and P8 meet a criteria, and updating P5 if that criteria is met. In other words, the VC-1 filter computes the values for a predefined group of pixels—edge pixels P4 and P5—of the a predefined row (R3), based on values in another predefined group of pixels in the same row—the value of P4 depends on P1, P2, and P3, and the value of P5 depends on P6, P7, and P8.

The VC-1 filter conditionally updates the same predefined group of pixels in the remaining rows, depending on the computed values for the predefined groups of pixels (edge pixels P4 and P5) in the predefined row (R3). Thus, P4 in R1 is updated, based on P1, P2 and P3 also in R1, but only if P4 and P5 in R3 are updated. Similarly, P5 in R1 is updated, based on P6, P7, and P8, but only if P4 and P5 in R3 are updated. Rows R2 and R4 are handled in a similar manner.

Viewed another way, some pixels in a predefined third row of pixels are filtered, or updated, if other pixels in the third row meet a criteria. The filter involves comparisons and calculations performed on these other pixels. If these other pixels in the third row do meet the criteria, corresponding pixels in the remaining rows are filtered in an analogous manner, as described above. Some of the embodiments of inloop deblocking filter 290 disclosed herein use an inventive technique in which the third row is filtered first, and the remaining rows are filtered after the third row. These inventive techniques will be described in more detail in connection with FIGS. 4, 5, and 6A-6D.

Although FIG. 3 illustrates vertical edge processing by rows, a person of ordinary skill in the art should understand that the same diagram, when rotated 90° clockwise, also describes horizontal edge processing by columns. A person of ordinary skill in the art should also appreciate that although VC-1 uses the third row of four as the predefined row which determines the conditional update of the other rows, the principles disclosed herein also apply to embodiments in which a different predefined row is used (e.g., the first row, the second row, etc.), and to still other embodiments in which a different number of rows forms a sub-block. Similarly, a person of ordinary skill in the art should also appreciate that although VC-1 examines the values in a group of neighboring pixels to set the value of the updated pixel, the principles disclosed herein also apply to embodiments in which other pixels are examined and other pixels are set. As just one example, P2 and P3 may be examined to determine the updated value of P4. As yet one more example, P3 may be set based on the values in P2 and P4.

Video acceleration unit 150 in GPU 120 implements hardware acceleration logic for an inloop deblocking filter (IDF), for example, the IDF specified by VC-1. A GPU instruction exposes this hardware acceleration logic, as will be described later. The conventional approach to implementing a VC-1 IDF processes each row/column in parallel, since the same pixel calculations are performed on each row/column of a sub-block. This conventional approach filters two adjacent 4×4 sub-blocks every cycle, but requires an increased gate count to do so. In contrast, an inventive approach used by VC-1 IDF hardware acceleration logic 400 processes the third row/column pixels first, and if these pixels meet the required criteria, then sequentially processes the remaining 3 rows/columns. This inventive approach uses less gates than the conventional approach, which replicates functionality for each row/column. The sequential row processing of VC-1 IDF hardware acceleration logic 400 filters two adjacent 4×4 sub-blocks every four cycles. This longer filter time is consistent with the instruction cycle of GPU 120, where the faster filter of the conventional approach is actually faster than necessary, at the expense of gate count.

FIG. 4 is a listing of hardware description pseudocode for VC-1 IDF hardware acceleration logic 400. Although pseudocode is used rather than an actual hardware description language (HDL), such as Verilog and VHDL, a person of ordinary skill in the art should be familiar with such pseudocode. Such a person should also understand that when expressed in an actual HDL, the code can be compiled and then synthesized into an arrangement of logic gates which makes up a portion of video acceleration unit 150. Such a person should also understand that these logic gates may be implemented by various technologies, for example, an application specific circuit (ASIC), programmable gate array (PGA), or field programmable gate array (FPGA).

Section 410 of the code is the module definition. VC-1 IDF hardware acceleration logic 400 has several input parameters. The sub-block to be filtered is specified by the Block parameter. If the Vertical parameter is True, then the acceleration logic 400 treats the Block parameter as a 4×8 block (see FIG. 3) and performs vertical edge filtering. If the Vertical Parameter is False, then the acceleration logic 400 treats the Block parameter as an 8×4 input block and performs horizontal edge filtering.

Section 420 of the code starts an iteration loop, setting the value of the LoopIndex variable. The first time through the loop, LoopIndex is set to 3 so the third line is processed first. Subsequent loop iterations set LoopIndex to 1, 2, and then 4. Using this index, VC-1 IDF hardware acceleration logic 400 iterates through 4 lines, processing 8 pixels at a time, where a line is either a horizontal row or a vertical column, depending on the Vertical parameter. Each line is processed by line acceleration logic 500 (see FIG. 5). In some embodiments, this line acceleration logic 500 is implemented as an HDL submodule, as will be described in connection with FIG. 5.

Section 430 tests the Vertical parameter to determine whether vertical or horizontal edge filtering is to be performed. Depending on the result, the 8 elements of the Line array variable are initialized from the rows of a 4×8 input block or from columns of an 8×4 input block.

Section 440 determines if the third line is being processed, by comparing the LoopIndex (set by section 420) to 3. If LoopIndex is 3, two other control variables, ProcessingPixel3 and FilterOther3, are set to True. If LoopIndex is not 3, ProcessingPixel3 is set to True.

Section 450 instantiates another HDL module, VC1_IDC_Filter_Line, to apply the filter to the current line. (As described above in connection with FIG. 3, the line filter updates edge pixel values based on neighboring pixel values.) The parameters provided to the submodule include the control variables ProcessingPixel3 and FilterOther3 and the LoopIndex variable. In one embodiment, VC-1 IDF hardware acceleration logic 400 has an additional input parameter, a quantization value, and this quantization parameter is also provided to the submodule.

After the submodule processes the line, VC-1 IDF hardware acceleration logic 400 continues the iteration loop at section 420, with an updated value for LoopIndex. In this manner, the filter is applied to the third line, then the first line, then second line, then fourth line of the input block.

FIG. 5 is a listing of hardware description language code for line acceleration logic 500, which implements the submodule referred to above. Section 510 of the code is a module definition. Line acceleration logic 500 has several input parameters. The line to be filtered is specified by the Line input parameter. ProcessingPixel3 is an input parameter which is set to True by higher-level logic if this line is the 3rd row or column. The FilterOther3 parameter is initially set by higher-level logic to True, but is modified by line acceleration logic 500 based on pixel values.

Section 520 performs various pixel value calculations as specified by VC-1. (Since the calculations can be understood by reference to the VC-1 specification, no detailed discussion of these calculations is necessary.) Section 530 tests the ProcessingPixel3 parameter provided by higher level VC-1 IDF hardware acceleration logic 400. If ProcessingPixel3 is True, then section 530 initializes a control variable DoFilter to a default value of True. Various results of intermediate calculations in section 520 are used to determine if the other 3 lines should also be processed. If the pixel calculation results indicate that the other 3 lines are not to be processed, then DoFilter is set to False.

If ProcessingPixel is False, section 540 uses the input parameter FilterOther3 (set by higher level VC-1 IDF hardware acceleration logic 400) to set the value of DoFilter. Section 550 tests the DoFilter variable and updates the edge pixels P4 and P5 (see FIG. 3) in the Line variable if DoFilter is True.

Section 560 tests the ProcessingPixel3 parameter, and updates FilterOther3 appropriately. The FilterOther3 variable is used to convey state information between different instantiations of this module. If ProcessingPixel3 is True, then section 550 updates the FilterOther3 parameter with the value of DoFilter, as determined by section 540. This technique allows the higher-level module that instantiated this module (namely, VC1_InloopFilter) to provide the FilterOther3 value that was updated by this instantiation of the VC1_InLoopFilter_Line low-level module to another instantiation of VC1_InLoopFilter_Line.

A person of ordinary skill in the art should appreciate that the pseudocode of FIG. 5 can be synthesized in a variety of ways to produce an arrangement of logic gates which implements line acceleration logic 500. One such arrangement is depicted in FIGS. 6A-D, which together form a block diagram of line acceleration logic 500. A person of ordinary skill in the art should be familiar with the VC-1 in-loop deblocking filter algorithm, as well as with logic structures. Therefore, the components of FIGS. 6A-D will not all be discussed in detail. Instead, selected features of line acceleration logic 500 will be described.

As should be known to a person of ordinary skill in the art, the computations involved in the VC-1 in-loop deblocking filter include the following, where P1-P8 refer to pixel positions within the row/column being processed.

$$A0 = (2*(P3-P6) - 5*(P4-P5) + 4) >> 3$$

$$A1 = (2*(P1-P4) - 5*(P2-P3) + 4) >> 3$$

$$A2 = (2*(P5-P8) - 5*(P6-P7) + 4) >> 3$$

$$clip = (P4-P5)/2$$

Each of the first three computations involves three subtractions, two multiplications, an addition, and a shift right. The portion of line acceleration logic 500 depicted in FIG. 6A uses shared logic to compute A0, A1, and A2 sequentially, rather than using specific individual logic blocks for A0, A1, and A2. By avoiding replication of logic blocks, this sequential processing, using multiplexers to sequence through inputs, reduces gate count and/or power consumption.

Multiplexers 605, 610, 615 and 620 are used to select different inputs from pixel registers P1-P8 at different clock cycles, and these inputs are provided to various common logic blocks. Logic blocks 625 and 630 each perform a subtractions. Logic block 635 multiplies by 2 by performing a left-shift-by-1. A multiply-by-5 is performed by left-shift-by-1 (640) followed by addition 645. Adder 650 adds the output of left shift 635, a constant value of 4, and the negative of the output of 645. Finally, logic block 655 performs a shift-right-by-3.

In the first clock cycle an input of T=1 is provided to the each of multiplexers 605, 610, and 615, and the value of A1 is computed and stored in register 660. In the second clock cycle an input of T=2 is provided to each of multiplexers 605, 610, and 615, and the value of A2 is computed and stored in register 665. In the third clock cycle an input of T=3 is provided to each of multiplexers 605, 610, and 615, and the value of A0 is computed and stored in register 670. The values of A0, A1, and A2 stored in registers 665, 660, and 670 will be used by the portion of line acceleration logic 500 depicted in FIG. 6B, which will be described below. The output of the P4 register (671) and the output of the P5 register (673) will be used by the portion of line acceleration logic 500 depicted in FIG. 6C, which will also be described below.

A person of ordinary skill in the art should also be aware of the following additional computations involved in the VC-1 in-loop deblocking filter:

```
D = 5*((sign(A0) * A3) - A0)/8
if (CLIP > 0)
{
    if(D < 0)
        D = 0
    if (D > CLIP)
        D = CLIP
}
else
{
    if (D > 0)
        D = 0
    if (D < CLIP)
        D = CLIP
}
```

Figure 6A:
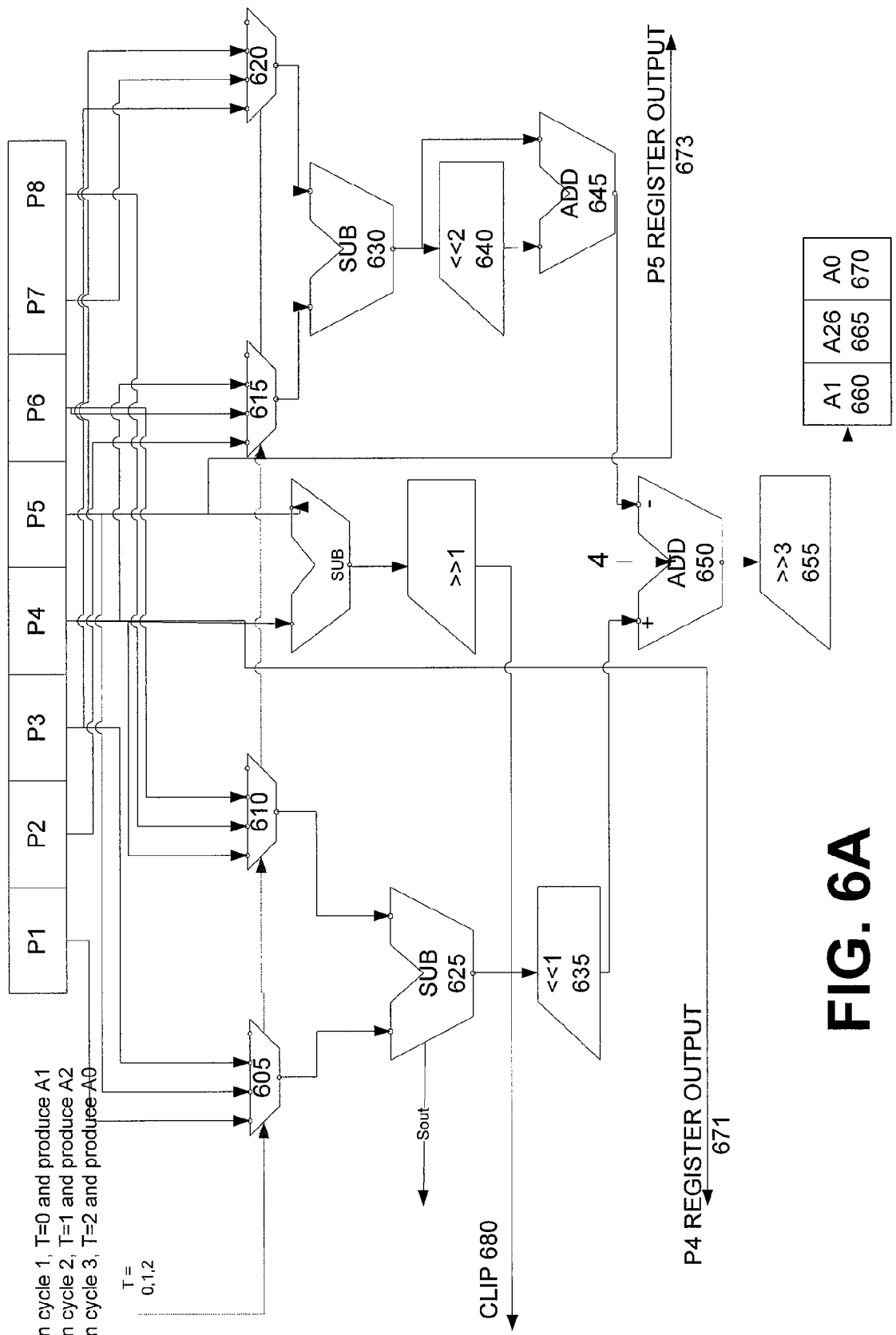
FIGS. 6A-6D form a block diagram of line acceleration logic 500 from FIGS. 4 and 5.
Figure 6B:
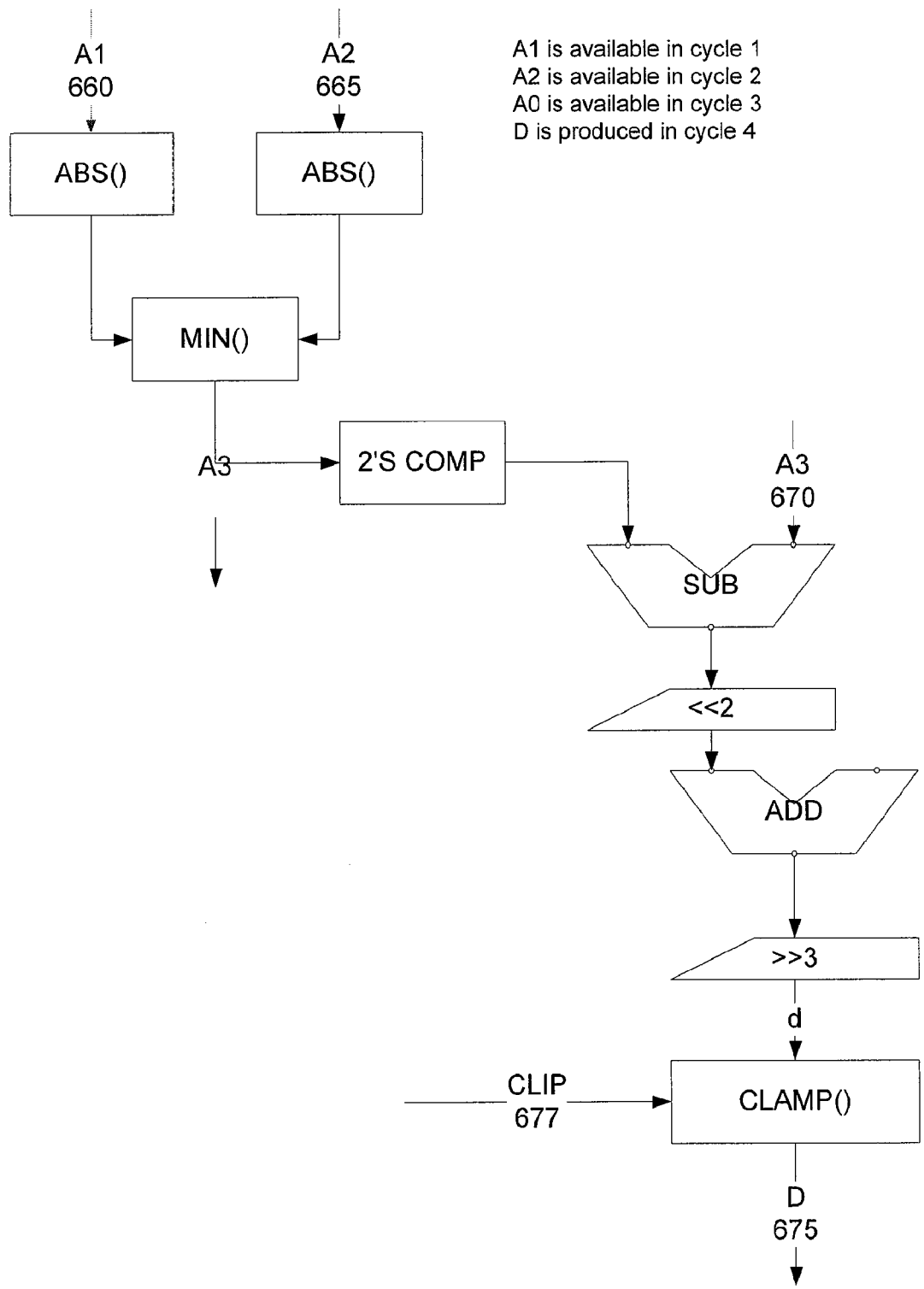

The portion of line acceleration logic 500 depicted in FIG. 6B receives inputs from the portion of line acceleration logic 500 depicted in FIG. 6A, and computes D (675). Referring again to FIG. 6A, CLIP (677) is produced (as follows: pixels P4 and P4 are subtracted by logic block 679, and the result is shifted right (integer divide by 2) by logic block 680 to produce CLIP 677. Returning back to FIG. 6B, A1 from register 660 is available in the first cycle, A2 from register 665 is available in the second cycle, and A9 from register 670 is available in the third cycle. Thus, in the fourth cycle the portion of line acceleration logic 500 depicted in FIG. 6B computes D (675) according to the equation shown above.

line acceleration logic 500 uses D (675) to update pixel positions P4 and P5. Specifically, P4=P4−D and P5=P5+D. Although FIGS. 6A and 6B were described earlier in connection with a single row/column (i.e., a single set of pixel positions P0-P8), computations for the third row/column of a sub-block affect the behavior of the other 3 rows/columns of the sub-block. line acceleration logic 500 uses an inventive approach to implement this behavior. While individual filtering computations are done up front—in parallel—described in connection with FIGS. 6A and 6B, the portions of line acceleration logic 500 shown in FIGS. 6C and 6D conditionally choose which positions to update. In other words, VC-1 IDF hardware acceleration logic 400 uses predication, where either the original value is written back, or the new value is written back. In contrast, a conventional approach to a VC-1 inloop deblocking filter uses looping, so that individual filtering computations are performed conditionally.

Figure 6C:
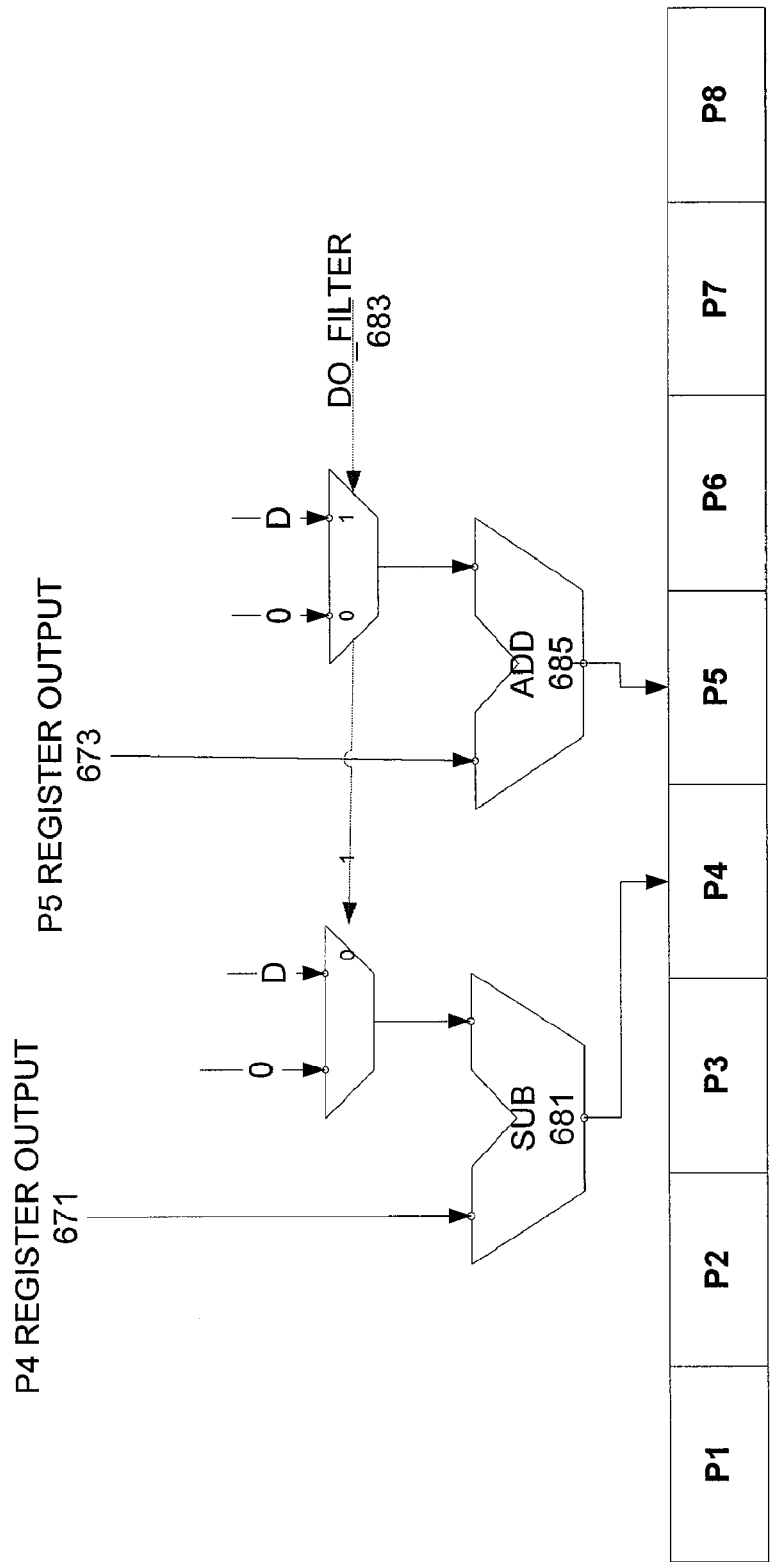

As explained earlier, the pseudocode of FIG. 4 which instantiates line acceleration logic 500 does so in a loop: instantiation section 450 appears within an iteration section 420. Furthermore, the instantiation of line acceleration logic 500 uses two parameters, ProcessingPixel_3 and FilterOther3. These parameters are used by line acceleration logic 500 as follows to perform conditional update of pixel positions P4 and P5. Referring now to FIG. 6C, register P4 is written with the result of subtractor 681, where subtractor 681 has inputs P4 (671) and either 0 or D (675), depending on the value of DO_FILTER (683). Similarly, register P5 is written with the result of adder 685, where adder 685 has inputs P5 (673) and either 0 or D (675), depending on the value of DO_FILTER 683. Thus, the updated value for P4 is the original P4 value (if DO_FILTER is False) or P4−D. Similarly, the updated value for P5 is the original P5 value (if DO_FILTER is False) or P5+D.

A person of ordinary skill in the art should recognize that when processing the third row of a sub-block, the criteria for updating P4 with P4−D is:

$$((ABS(A0)<PQUANT) \text{ OR } (A3<ABS(A0)) \text{ OR } (CLIP \mathrel{!}=0)$$

Figure 6D:
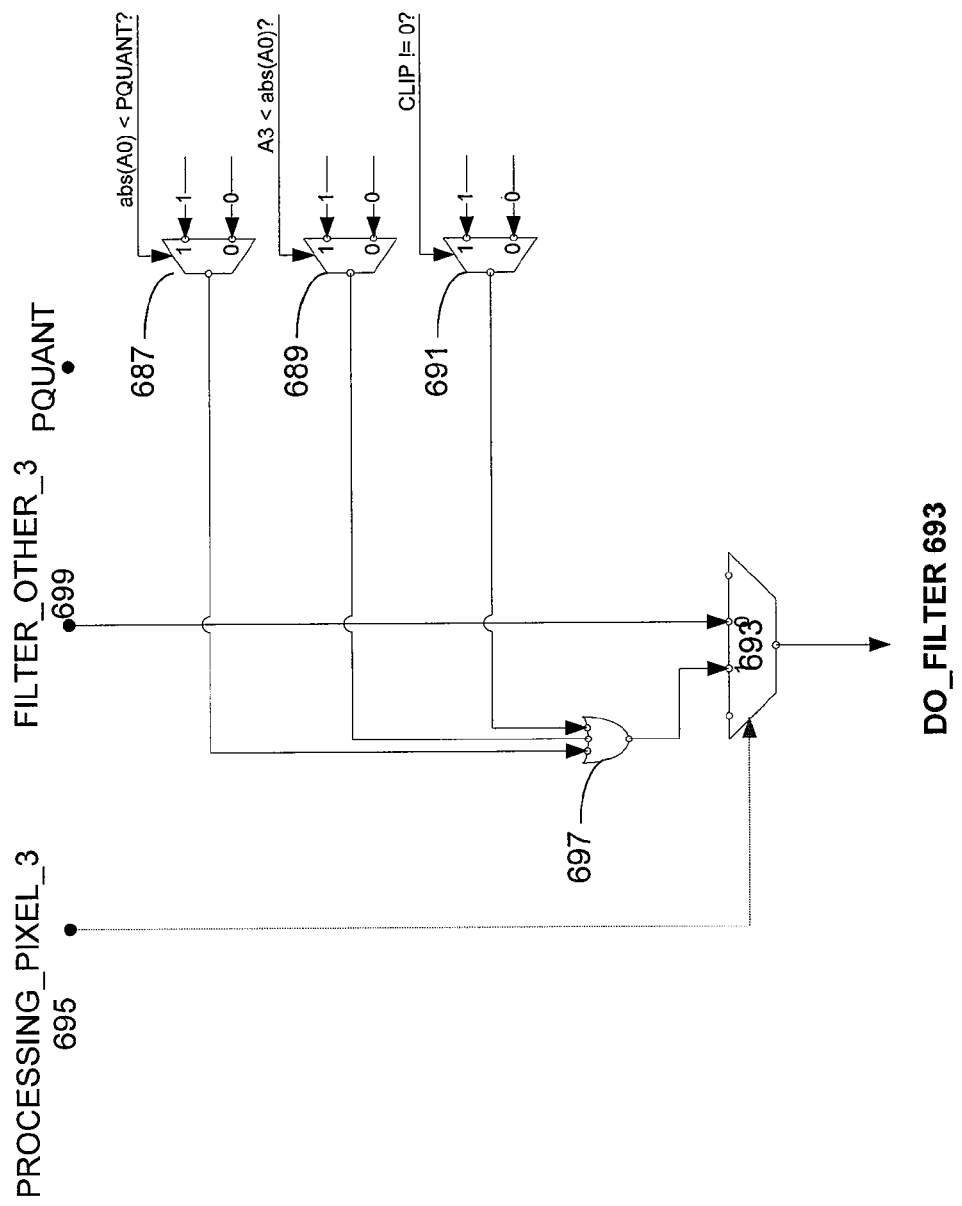

DO_FILTER 683 is computed by the portion of line acceleration logic 500 shown in FIG. 6D, which examines these conditions. Multiplexer 687 provides one input to OR-gate 697, selecting a TRUE output if ABS(A0)<PQUANT and FALSE otherwise. Multiplexer 689 provides another input to OR-gate 697, selecting a TRUE output if A3<ABS(A0) and FALSE otherwise. Multiplexer 691 provides another input to OR-gate 697, selecting a TRUE output if CLIP !=0, and FALSE otherwise.

DO_FILTER 683 is produced by multiplexer 693, which uses control input Processing_Pixel_3 (695) to select either the output of OR-gate 697 or the input signal Filter_Other_3 (699). Inputs Processing_Pixel_3 (695) and Filter_Other_3 (699) were introduced earlier in connection with FIG. 4 and the pseudo-code for higher level VC-1 IDF hardware acceleration logic 400 which instantiates line acceleration logic 500. Returning briefly to FIG. 4, Processing_Pixel_3 (695) is set to TRUE when processing the third row/column (first iteration) and FALSE otherwise. An intermediate variable Do_Filter records whether or not P4/P5 is updated, based on the conditions involving PQUANT, ABS(A0) and CLIP. Finally, the value of Filter_Other_3 (699) is set from this intermediate Do_Filter. The result of the logic portion of line acceleration logic 500 shown in FIGS. 6C and 6D is that every four cycles, the pixel positions P4 and P5 in four adjacent rows/columns are either set to filtered values (depending on variables such as A0-A3, PQUANT, CLIP, etc.) or are written again with their original values.

The VC-1 deblocking acceleration unit 400 employs an inventive combination of parallel and sequential processing, as just described. The parallel processing provides faster execution and reduces latency. Although this parallelization increases gate count, the increase is offset by the sequential processing described above. A conventional approach which did not use the sequential processing described above would further increase gate count.

Some embodiments of GPU 120 contain a hardware acceleration unit for H.264 deblocking, where the deblocking function is exposed through GPU instructions. GPU 120 will now be described in further detail in connection with FIG. 8, with an emphasis on the particular choice of GPU instructions to expose H.264 deblocking acceleration.

Graphics Processor

Rationale for Multiple Deblocking Instructions

The instruction set of GPU 120 includes instructions that portions of decoder 160 running in software can use to accelerate a deblocking filter. An inventive technique described here provides not one, but multiple GPU instructions for acceleration of a particular deblocking filter. Inloop deblocking filter 290 is sequential in nature, in the sense that a particular filter implies an order in which pixels are filtered (e.g., H.264 specifies left to right then top to bottom). Thus, previously filtered and updated pixel values are used as inputs when filtering later pixels.

This sequential nature is a good match for a conventional deblocking filter implemented in software running on a host processor. The host processor accesses pixel values stored in conventional memory, which allows back-to-back pixel reads and writes. However, this sequential nature is not a good match when inloop deblocking filter 290 uses a GPU to accelerate portions of the filter process. A conventional GPU stores pixels in a texture cache, and the GPU pipeline design does not allow back-to-back reads and writes of the texture cache.

Some embodiments of GPU 120 disclosed herein provide multiple GPU instructions which can be used together to accelerate a specific deblocking filter. Some of the instructions use the texture cache as a source of pixel data, and some of the instructions use the GPU execution unit(s) as a source. Inloop deblocking filter 290 uses these different GPU instructions in appropriate combinations to achieve back-to-back pixel reads and writes. An overview of the data flow through GPU 120 is presented next, followed by further explanation of the deblocking acceleration instructions provided by GPU 120 and the use of these instructions by inloop deblocking filter 290.

GPU Flow

Figure 7:
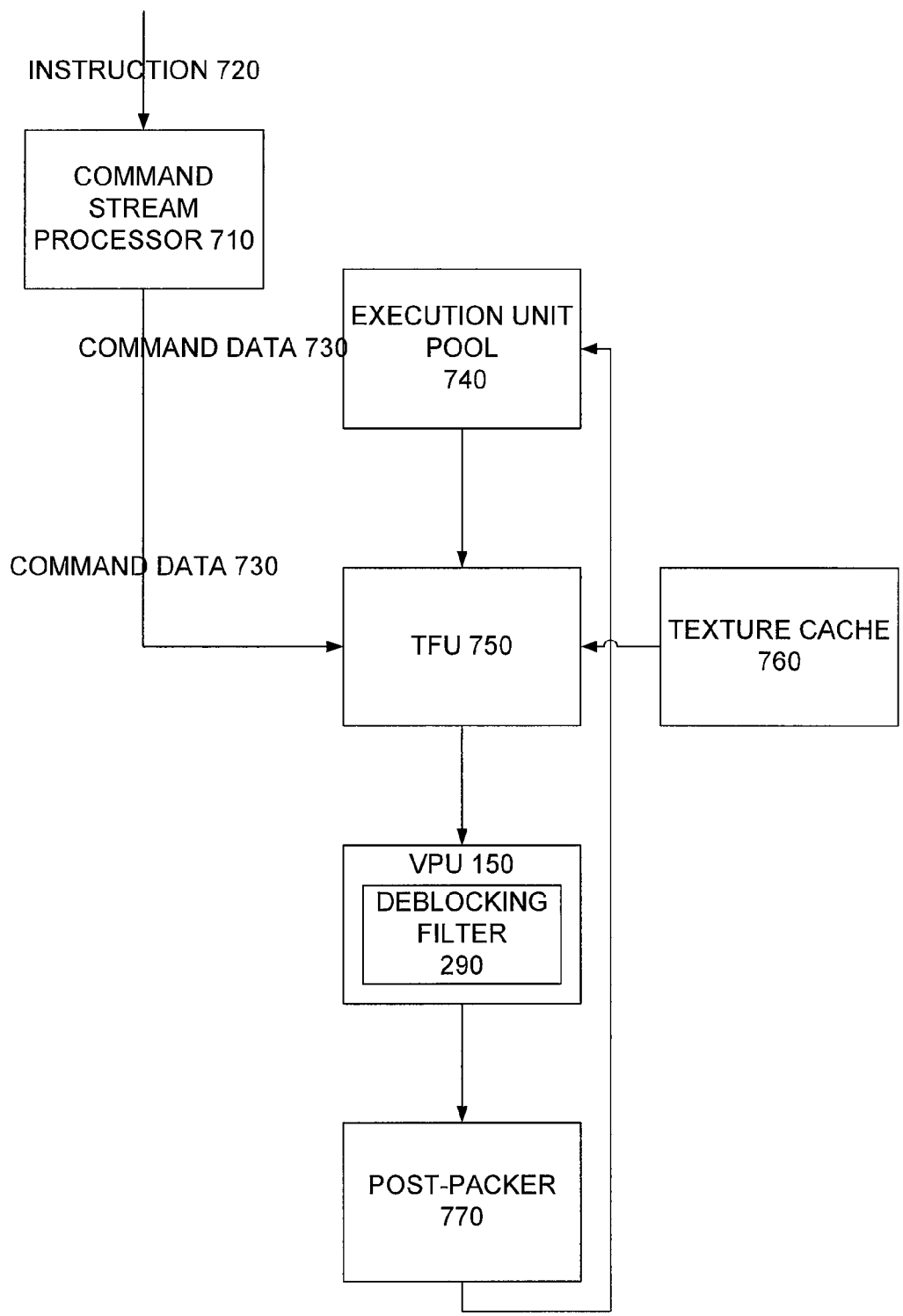
FIG. 7 is a data flow diagram for the GPU 120 from FIG. 1.

FIG. 7 is a data flow diagram for GPU 120, in which command flow is shown by arrows on the left portion of FIG. 7, and flow of image or graphics data is shown by arrows on the right. Omitted from FIG. 7 are a number of conventional components, known to those skilled in the art, that are unnecessary to explain the inloop deblocking features of GPU 120. A command stream processor 710 receives an instruction 720 over a system bus (not shown) and decodes the instruction, producing command data 730, such as vertex data. GPU 120 supports conventional graphics processing instructions, as well as instructions which accelerate video encoding and/or decoding.

Conventional graphics instructions involve tasks such as vertex shading, geometry shading, and pixel shading. For this reason, command data 730 is supplied to a pool (740) of shader execution units. Shader execution units make use of a texture filter unit (TFU) 750 as needed, for example, to apply a texture to a pixel. Texture data is cached in texture cache 760, which is backed by main memory (not shown).

Some instructions are passed to video accelerator 150, whose operation will be described below. Data produced by is further processed by post-packer 770, which compresses the data. After post-processing, data produced by video acceleration unit 150 is provided to execution unit pool 740.

Execution of video encode/decode acceleration instructions, such as the deblocking filter instructions described herein, differs in several respects from execution of conventional graphics instructions as described above. First, video acceleration instructions are executed by video acceleration unit 150, rather than by shader execution units. Second, video acceleration instructions do not use texture data, per se.

However, both the image data used by video acceleration instructions and the texture data used by graphics instructions are two-dimensional arrays. GPU 120 takes advantage of this similarity, using TFU 750 to load image data for video acceleration unit 150, thus allowing texture cache 760 to cache some of the image data operated on by video acceleration unit 150. For this reason, video acceleration unit 150 is located as shown in FIG. 7, between TFU 750 and post-packer 770.

TFU 750 examines command data 730 extracted from instruction 720. Command data 730 further provides TFU 750 with coordinates of the desired image data within texture cache 760. In one embodiment, these coordinates are specified as U,V pairs, which should be familiar to a person of ordinary skill in the art. When instruction 720 is a video acceleration instruction, the extracted command data 730 further instructs TFU 750 to bypass texture filters (not shown) within TFU 750.

In this manner, TFU 750 is leveraged for video acceleration instructions to load image data for video acceleration unit 150. video acceleration unit 150 receives image data from TFU 750 in the data path, and command data 730 from the command path, and performs an operation on the image data according to command data 730. The resulting image data output by video acceleration unit 150 is fed back to execution unit pool 740, after further processing by post-packer 770.

Deblocking Instructions

The embodiment of GPU 120 described herein provides hardware acceleration for the VC-1 deblocking filter and the H.264 deblocking filter. The VC-1 deblocking filter accelerator is accessed by one GPU instruction ("IDF_VC-1"), while the H.264 deblocking filter accelerator is accessed by three GPU instructions ("IDF_H264_0", "IDF_H264_1", and "IDF_H264_2").

As explained earlier, each GPU instruction is decoded and parsed into command data 730, which can be viewed as a set of parameters specific to each instruction, shown in Table 1. The IDF_H264_x instructions share some common parameters, while others are specific to one instruction. A person of ordinary skill in the art should understand that these parameters can be encoded using a variety of opcodes and instruction formats, so these topics will not be discussed here.

TABLE 1

Parameters for IDF_H264 Instructions

| Parameter | Size | Operand | Description |
|---|---|---|---|
| FieldFlag (Input) | 1-bit | | If FieldFlag == 1 then Field Picture, else Frame Picture |
| TopFieldFlag (Input) | 1-bit | | If TopFieldFlag == 1 then Top-Field-Picture, else Bottom-Field-Picture if FieldFlag is set. |
| PictureWidth (Input) | 16-bit | | e.g., 1920 for HDTV |
| PictureHeight (Input) | 16-bit | | e.g., 1080 for 30P HDTV |
| YC Flag | 1-bit | Control-2 | Y plane or Chrominance Plane |
| Field Direction | 1-bit | Control-1 | |
| CBCR Flag | 1-bit | Control-1 | Cb or Cr |
| BaseAddress (Input) | 32-bit unsigned | | For IDF_H64_0 and IDF_H64_0: Sub-block Base Address in Texture Memory |
| BlockAddress (Input) | 13.3 format, with fractional part ignored | SRC1[0:15] = U SRC1[31:16] = V | For IDF_H64_0: Texture Coordinates of Entire Sub-Block (relative to Base Address) For IDF_H64_1: Texture Coordinates of remaining half of Sub-Block (relative to Base Address) Not used in IDF_H64_2 |
| DataBlock1 | 4x4x8-bit | | Not used in IDF_H64_0 |
| | | SRC2[127:0] | For IDF_H64_1: either the Top or the Left half of the sub-block, depending on FilterDirection encoded in Control 2 parameter |
| | | SRC2[127:0] | For IDF_H64_2: First (Even) register pair |
| DataBlock2 | 4x4x8-bit | | Not used in IDF_H64_0 or IDF_H64_1 |
| | | SRC2[255:128] | For IDF_H64_2: Second (Odd) register pair |
| Sub-block (Output) | 128-bit | | Deblocked 8x4x8-bit subblock (128-bit) |

Several input parameters, used in combination, determine the address of the 4×4 block to be fetched by TFU 750. The BaseAddress parameter points to the start of the texture data within the texture cache. The top-left coordinate of the block within this region is given by the BlockAddress parameter. The PictureHeight and PictureWidth input parameters are used to determine the extent of the block, i.e., the bottom-left coordinates. Finally, the video picture may be progressive or interlaced. If interlaced, it consists of two fields (top and bottom fields). The TFU 750 uses the FieldFlag and TopField-Flag to properly handle interlace images.

The deblocked 8×48×-bit output is provided in a destination register, and is also written back to execution unit pool 740. Writing the deblocked output back to execution unit pool 740 is a "modify in place" operation, which is desirable in some decoder implementations such as H.264 where the pixel values in blocks to the right and bottom depend on the previous results computed. However, the VC-1 decoder is not as restrictive in this regard as H.264. In VC-1, every 8×8 boundaries (first vertical, then horizontal) are filtered. All vertical edges can therefore be performed substantially in parallel, with 4×4 edges filtered after that. Parallelism can be exploited because only the two pixels (one on either side of the edge) may be updated, and these pixels are not used in the computation of the other edges.

Since deblocked data is written back to execution unit pool 740 rather than to texture cache 760, different IDF_H264_x instructions are provided which allow sub-blocks to be fetched from different locations. This can been seen in Table 1, in the description of the Block Address, Data Block 1, and Data Block 2 parameters. The IDF_H264_0 instruction fetches the entire 8×4×8-bit sub-block from texture cache 760. The IDF_H264_1 instruction fetches half of the sub-block from texture cache 760 and half from the execution unit pool 740. The IDF_H64_2 instruction fetches the entire sub-block from the execution unit pool 740.

The use of IDF_H64_X instruction variations by decoder 160 will be discussed in more detail in connection with FIG. 8. Next is a description of the process by which TFU 750 and execution unit pool 740 transform fetched pixel data before supplying this data to video acceleration unit 150.

Transformation of Image Data

The instruction parameters, described above, provide TFU 750 with coordinates of the desired sub-block to be fetched from texture cache 760 or from execution unit pool 740. Image data contains luminance (Y) and chrominance (Cb, Cr) planes. A YC flag input parameter specifies whether the Y plane or the CbCr plane is being processed.

When processing luminance (Y) data, as indicated by the YC flag parameter, TFU 750 fetches the subblock and provides the 128 bits as input to VC-1 IDF hardware acceleration logic 400 (e.g., as the Block input parameter in the example VC-1 accelerator of FIG. 4). The resultant data is written to destination registers as a register quad (i.e., DST, DST+1, DST+2, DST+3).

When processing chrominance data, as indicated by the YC flag parameter, the Cb and Cr blocks will be processed consecutively by VC-1 IDF hardware acceleration logic 400. The resultant data is written to texture cache 760. In some embodiments, this write occurs over two cycles, with each cycle writing 256 bits.

Some video acceleration unit embodiments use interleaved CbCr planes, each stored as half-width and half-height. In these embodiments, TFU 750 de-interleaves CbCr sub-block data for video acceleration unit 150 into a buffer used to communicate between TFU 750 and video acceleration unit 150. Specifically, TFU 750 writes two 4×4 Cb blocks into the buffer, and then writes two 4×4 Cr blocks into the buffer. The 8×4 Cb block is processed first by VC-1 IDF hardware acceleration logic 400, and the resultant data is written to texture cache 760. The 8×4 Cb block is processed next by VC-1 IDF hardware acceleration logic 400, and the resultant data is written to texture cache 760. Video acceleration unit 150 uses the CbCr flag parameter to manage this sequential process.

Use of Deblocking Instructions by Software Decoder

As discussed earlier in connection with FIG. 1, decoder 160 runs on host processor 110 but also takes advantage of video acceleration instructions provided by GPU 120. Specifically, embodiments of H.264 Inloop deblocking filter 290 use particular combinations of the IDF_H264_x instructions to process edges in the order specified by H.264, fetching some sub-blocks from texture cache 760 and others from execution unit pool 740. When used in appropriate combinations, these IDF_H264_x instructions achieve back-to-back pixel reads and writes.

FIG. 8 is a block diagram of a 16×16 macroblock as used in H.264. The macroblock is subdivided into sixteen 4×4 sub-blocks, each of which undergoes deblocking. The four sub-blocks in FIG. 8 can be identified by row and column (e.g., R1, C2). H.264 specifies that vertical edges are processed first, then horizontal edges, in the edge order shown in FIG. 8 (a-h).

Thus, the deblocking filter is applied to edges between pairs of sub-blocks, with sub-block pairs filtered in this order:
edge a=[block to left of R1,C1]|[R1,C1]; [block to left of R2,C1]|[R2,C1];
[block to left of R3,C1]|[R3,C1]; [block to left of R4,C1] |[R4,C1];
edge b=[R1,C1]|[R2,C2], [R2,C1]|[R2,C2]; [R3,C1]|[R3,C2]; [R4,C1]|[R4,C2];
edge c=[R1,C2]|[R2,C3]; [R2,C2]|[R2,C3]; [R3,C2]|[R3,C3]; [R4,C2]|[R4,C3];
edge d=[R1,C3]|[R2,C4]; [R2,C3]|[R2,C4]; [R3,C3]|[R3,C4]; [R4,C3]|[R4,C4];
edge e=[block to top of R1,C1]|[R1,C1] [block to top of R1,C2]|[R1,C2];
[block to top of R1,C3]|[R1,C3]; [block to top of R1,C4]| [R1,C4];
edge f=[R1,C1]|[R2,C1]; [R1,C2]|[R2,C2]; [R1,C3]|[R2,C3]; [R1,C4]|[R2,C4]
edge g=[R2,C1]|[R3,C1]; [R2,C2]|[R3,C2]; [R2,C3]|[R3,C3]; [R2,C4]|[R3,C4];
edge h=[R3,C1]|[R4,C1]; [R3,C2]|[R4,C2]; [R3,C3]|[R4,C3]; [R3,C4]|[R4,C4]

For the first pair of sub-blocks, both are loaded from texture cache 760, since no pixels in the macroblock have yet been changed by application of the filter. Although the filter for the first vertical edge (a) can change pixel values in (R1, C1), the vertical edge of the second row does share any pixels in the vertical edge of the first row. Therefore, the second pair of sub-blocks (edge b) is also loaded from texture cache 760. Since vertical edges between adjacent rows do not share pixels, the same holds true for the third pair (edge c) and fourth pairs (edge d) of sub-blocks.

The particular IDF_H264_x instruction issued by inloop deblocking filter 290 determines the location from which pixel data is loaded. Thus, the sequence of IDF_H264_x instructions used by Inloop deblocking filter 290 to process the first set of vertical edges (a-d) is:
IDF_H264_0 SRC1=address of (R1,C1);
IDF_H264_0 SRC1=address of (R2,C1);
IDF_H264_0 SRC1=address of (R3,C1);
IDF_H264_0 SRC1=address of (R4,C1);

Next, inloop deblocking filter 290 processes the second vertical edge (b), starting with (R1,C2). The leftmost 4 pixels in the 8×4 sub-block specified by (R1,C2) overlap with the rightmost pixels in the (R1,C1) sub-block. These overlapping pixels which were processed by, and possibly updated by, the vertical edge filter for (R1,C1) are therefore be loaded from execution unit pool 740 instead of texture cache 760. However, the rightmost 4 pixels in the (R1,C2) sub-block have not yet been filtered, and are therefore loaded from texture cache 760. The same holds true for sub-blocks (R2,C2) to (R4,C2). Inloop deblocking filter 290 accomplishes this result by issuing the following sequence of IDF_H264_x to process the second set of vertical edges:
IDF_H264_1 SRC1=address of (R1,C2);
IDF_H264_1 SRC1=address of (R2,C2);
IDF_H264_1 SRC1=address of (R3,C2);
IDF_H264_1 SRC1=address of (R4,C2);

When the third set of vertical edges is processed, starting with (R1,C3), the leftmost 4 pixels in the 8×4 sub-block (R1,C3) overlap with the rightmost pixels in the (R1,C2) sub-block, and must therefore be loaded from execution unit pool 740 instead of texture cache 760. However, the rightmost 4 pixels in the (R1,C2) sub-block have not yet been filtered, and are therefore loaded from texture cache 760. The same holds true for sub-blocks (R1,C2) to (R4,C2). An analogous situation occurs for the last set of vertical edges. Thus, inloop deblocking filter 290 issues the following sequence of IDF_H264_x to process the remaining two sets of vertical edges:

IDF_H264_1 SRC1=address of (R1,C3);
IDF_H264_1 SRC1=address of (R2,C3);
IDF_H264_1 SRC1=address of (R3,C3);
IDF_H264_1 SRC1=address of (R4,C3);
IDF_H264_1 SRC1=address of (R1,C4);
IDF_H264_1 SRC1=address of (R2,C4);
IDF_H264_1 SRC1=address of (R3,C4);
IDF_H264_1 SRC1=address of (R4,C4);

Horizontal edges (e-h) are processed next. At this point, the deblocking filter has been applied to every sub-block in the macroblock, and thus every pixel may have been updated. For this reason, each sub-block submitted for horizontal edge filtering is loaded from execution unit pool 740 rather than texture cache 760. Thus, inloop deblocking filter 290 uses the issues the following sequence of IDF_H264_x to process horizontal edges:

IDF_H264_2 SRC1=address of (R1,C1);
IDF_H264_2 SRC1=address of (R2,C1);
IDF_H264_2 SRC1=address of (R3,C1);
IDF_H264_2 SRC1=address of (R4,C1);
IDF_H264_2 SRC1=address of (R1,C2);
IDF_H264_2 SRC1=address of (R2,C2);
IDF_H264_2 SRC1=address of (R3,C2);
IDF_H264_2 SRC1=address of (R4,C2);
IDF_H264_2 SRC1=address of (R1,C3);
IDF_H264_2 SRC1=address of (R2,C3);
IDF_H264_2 SRC1=address of (R3,C3);
IDF_H264_2 SRC1=address of (R4,C3);
IDF_H264_2 SRC1=address of (R1,C4);
IDF_H264_2 SRC1=address of (R2,C4);
IDF_H264_2 SRC1=address of (R3,C4);
IDF_H264_2 SRC1=address of (R4,C4);

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be implemented in software, hardware or a combination thereof. In some embodiments, the system and/or method is implemented in software that is stored in a memory and is executed by a suitable processor (including but not limited to a microprocessor, microcontroller, network processor, reconfigurable processor, or extensible processor) situated in a computing device. In other embodiments, the system and/or method is implemented in logic, including but not limited to a programmable logic device (PLD), programmable gate array (PGA), field programmable gate array (FPGA), or application specific circuit (ASIC). In still other embodiments, the logic described herein is implemented within a graphics processor or graphics processing unit (GPU).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A deblocking filter executed by hardware logic for video decoding, comprising:
   logic circuit configured to perform a corresponding filtering calculation for each one of a plurality of pixel groups according to a corresponding set of taps in a plurality of sets of taps;
   logic circuit configured to determine if pixels in a predefined one of the plurality of pixel groups meets a criteria;
   logic circuit configured to filter the pixels in the predefined pixel group first according to the corresponding filtering calculation, if the criteria is met;
   logic circuit configured to sequentially filter the pixels in each of the remaining pixel groups in the plurality, according to the corresponding filtering calculation, if the criteria is met; and
   wherein the pixels in the plurality of pixel groups remain unfiltered according to the corresponding filtering calculations, if the criteria is unmet.

2. The deblocking filter of claim 1, wherein the plurality of pixel groups forms a rectangular pixel block, and each of the pixel groups comprises a row of the pixel block.

3. The deblocking filter of claim 1, wherein the plurality of pixel groups forms a rectangular pixel block, and each of the pixel groups comprises a column of the pixel block.

4. The deblocking filter of claim 1, wherein the logic circuit configured to sequentially filter further comprises:

logic circuit configured to update a first predefined set of pixels in each remaining pixel group based on a second predefined set of pixels in the each remaining pixel group.

5. The deblocking filter of claim 1, wherein the deblocking filter is applied to edges between pairs of sub-blocks to remove edge artifacts.

6. The deblocking filter of claim 1, wherein the deblocking filter uses a plurality of graphic processing unit instructions in appropriate combinations to achieve back-to-back pixel reads and writes.

7. The deblocking filter of claim 1, wherein the deblocking filter is specified by the VC-1 standard.

8. The deblocking filter of claim 1, wherein the logic circuit configured to perform the filtering calculations is further configured to perform the corresponding filtering calculation for each one of the plurality of pixel groups in parallel.

9. A video decoder executed by hardware logic comprising:
    an entropy decoder circuit receiving an incoming coded bit stream;
    a spatial decoder circuit receiving the output of the entropy encoder and producing an encoded picture comprising a plurality of pixels;
    logic circuit configured to combine a current picture with a prediction picture to produce a combined picture; and
    an inloop deblocking filter circuit receiving the combined picture, the inloop deblocking filter comprising:
        logic circuit configured to perform a corresponding filtering calculation for each one of a plurality of pixel groups according to a corresponding set of taps in a plurality of sets of taps;
        logic circuit configured to filter a predefined one of the plurality of pixel groups according to the corresponding filtering calculation, if the predefined one of the plurality of pixel groups meets a criteria; and
        logic circuit configured to filter each of the remaining pixel groups in the plurality after the predefined one of the plurality of pixel groups, according to the corresponding filter calculation, if the predefined one of the plurality of pixel groups meets the criteria;
        wherein the pixels in the plurality of pixel groups remain unfiltered according to the corresponding filtering calculations, if the criteria is unmet by the predefined one of the plurality of pixel groups.

10. The video decoder of claim 9, wherein the plurality of pixel groups forms a rectangular pixel block, and each of the pixel groups comprises a row of the pixel block.

11. The video decoder of claim 9, wherein the plurality of pixel groups forms a rectangular pixel block, and each of the pixel groups comprises a column of the pixel block.

12. The video decoder of claim 9, wherein the logic circuit configured to filter each of the remaining pixel groups further comprises:
    logic circuit configured to update a first predefined set of pixels in each remaining pixel group based on a second predefined set of pixels in each remaining pixel group.

13. The video decoder of claim 9, wherein the deblocking circuit filter is specified by the VC-1 standard.

14. The video decoder of claim 9, wherein the logic circuit configured to perform the filtering calculations is further configured to perform the corresponding filtering calculation for each one of the plurality of pixel groups in parallel.

15. A graphics processing unit (GPU) comprising:
    a host processor interface receiving video acceleration instructions; and
    a video acceleration unit responsive to the video acceleration instructions, the video acceleration function comprising an inloop deblocking filter, the inloop deblocking filter comprising:
        logic configured to perform a corresponding filtering calculation for each one of a plurality of pixel groups according to a corresponding set of taps in a plurality of sets of taps;
        logic configured to determine if pixels in a predetermined one of the plurality of pixel groups meets a first criteria;
        logic configured to filter the predetermined one of the pixel groups first according to the corresponding filtering calculation, if the first criteria is met; and
        logic configured to sequentially filter each of the remaining pixel groups in the plurality, according to the corresponding filtering calculation, if the first criteria is met;
        wherein the pixels in the plurality of pixel groups remain unfiltered according to the corresponding filtering calculations, if the criteria is unmet by the predefined one of the plurality of pixel groups.

16. The GPU of claim 15, wherein the plurality of pixel groups forms a rectangular pixel block, and each of the pixel groups comprises a row of the pixel block.

17. The GPU of claim 15, wherein the plurality of pixel groups forms a rectangular pixel block, and each of the pixel groups comprises a column of the pixel block.

18. The GPU of claim 15, wherein the logic configured to sequentially filter further comprises:
    logic configured to update a first predefined set of pixels in each pixel group based on a second predefined set of pixels in each pixel group.

19. The GPU of claim 15, wherein the deblocking filter is specified by the VC-1 standard.

20. The GPU of claim 15, wherein the logic circuit configured to perform the filtering calculations is further configured to perform the corresponding filtering calculation for each one of the plurality of pixel groups in parallel.

* * * * *